Dec. 4, 1928.

W. WEILER 1,694,241

INDUCTION MOTOR REGULATING SYSTEM

Filed Nov. 21, 1925

Inventor:
Wilhelm Weiler,
by *Alexander S. Lund*
His Attorney.

Patented Dec. 4, 1928.

UNITED STATES PATENT OFFICE.

WILHELM WEILER, OF NIEDERSCHONHAUSEN, GERMANY, ASSIGNOR TO GENERAL ELECTRIC COMPANY, A CORPORATION OF NEW YORK.

INDUCTION-MOTOR-REGULATING SYSTEM.

Application filed November 21, 1925, Serial No. 70,634, and in Germany December 10, 1924.

My invention relates to the speed control of induction motors, and in particular to means for increasing the slip of induction motors with load, at the same time providing desirable power factor correction.

My invention is particularly adapted to an induction motor drive installation where it is desired to take advantage of fly-wheel effect in smoothing out the load taken from the alternating current supply system with varying loads on the installation.

In carrying my invention into effect, I employ a commutator machine which is driven synchronously with the main motor. The commutator machine has stator and rotor windings connected in series with the secondary of the main motor and these windings are so arranged as to neutralize the effect of the secondary current flowing therein. The rotor winding of the commutator machine is also energized by a voltage proportional to the primary load current of the main motor and at such a phase angle as to provide the desired power factor correction. This arrangement permits the speed of the outfit to materially decrease with load while maintaining power factor correction.

The features of my invention which are believed to be novel and patentable will be pointed out in the claims appended hereto. For a better understanding of my invention, reference is made in the following description to the accompanying drawing in which Fig. 1 shows the mechanical arrangement of a preferred embodiment of my invention, and Fig. 2 illustrates the electrical connections for this arrangement.

Figure 1:
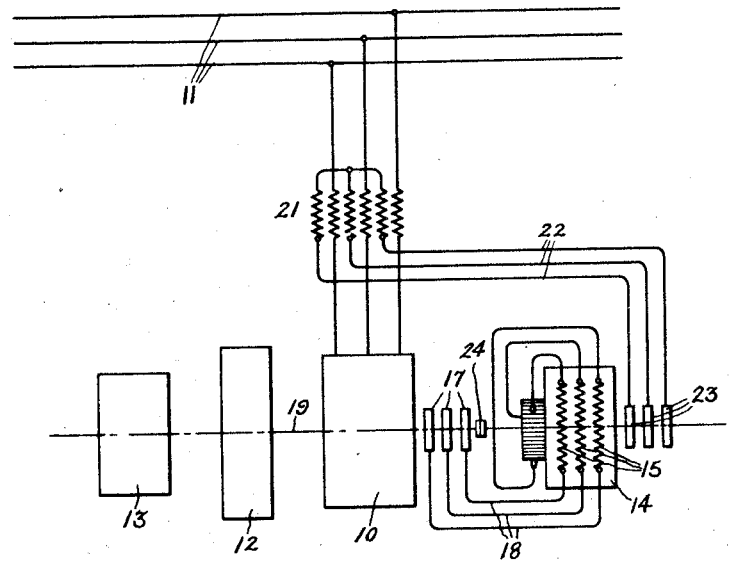

Referring to the drawing, in Fig. 1, 10 represents the main induction motor, the stator of which is supplied from the power supply line 11. 12 represents a fly-wheel, and 13 represents any variable load machine to be driven by the motor 10. 14 represents a commutator machine having stator windings 15 and a commutator winding 16 (see Fig. 2) connected in series with the secondary winding 16$^a$ of the main induction motor 10 through the slip rings 17 and leads 18. As shown in Fig. 1, the commutator machine 14 is mounted on the same shaft 19 with the main motor 10, fly-wheel 12, and the load machine 13, and has the same number of poles as 10. An equivalent geared arrangement may be used.

Figure 2:
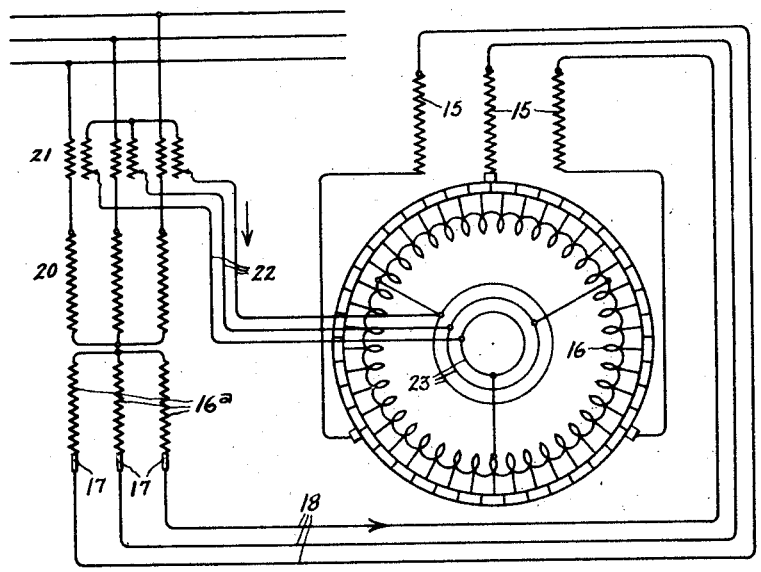

In Fig. 2 the primary of the main motor is represented at 20, and in series with its supply lines is a transformer 21, the secondary of which is connected to the commutated winding 16 by way of leads 22 and slip rings 23.

The stator winding 15 and the rotor winding 16 of machine 14 are arranged so that the effect of the current flowing in series therethrough from the secondary of motor 10 is neutralized, or substantially neutralized. Another way of stating this is to say that the rotor and stator fields produced by this current compensate and nullify each other without producing either torque or generator action. This may be readily accomplished by properly proportioning the two windings giving them the same resultant phase rotation and properly positioning the commutator brushes. However, the rotor winding 16 receives additional excitation from the transformer 21 which excitation is proportional to the primary current of the main motor. This additional excitation produces a resultant field in the commutator machine which is proportional to the primary current of the main motor and independent of its secondary current.

The sum of the electromotive forces generated in the commutator machine thus depends only upon the primary load current and the speed of the machine. The phase angle of this additional excitation is also made such as to provide the desired power factor correction for the main motor and may be properly adjusted in any convenient way, as, for example, by a change in the coupling angle at the coupling represented at 24.

It will be readily seen that if the motor load tends to increase, the excitation of machine 14 from the transformer 21 will increase and tend to decrease the motor load. This will allow the speed to decrease to such an extent that a large part of the additional load will be carried by the fly-wheel. The motor is thus caused to have series characteristics which may be made as strong as desired by the proper selection or adjustment of the transformer 21. The circuits of machine 14 may be of relatively low resistance. The energy given out by the secondary of motor 10 is for the most part utilized in operating machine 14 as a motor which is made possible by the additional excitation from transformer 21.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States is:—

1. In combination, an induction machine having a form wound secondary winding, a commutator machine driven in synchronism with said induction machine and having relatively movable commutated and field windings connected in series in the secondary circuit of said induction machine, said windings being arranged to substantially compensate each other such that in so far as the flow therein of the secondary current in the induction machine alone is concerned neither motor nor generator action would be produced in said commutated machine, and means for exciting the commutated winding of said commutator machine by a current proportional to the primary current of said induction machine, the phase angle of said excitation being such as to include the power factor of said induction machine.

2. In combination, an induction motor having a form wound secondary winding, a commutator machine having the same number of poles as said motor and driven directly therewith, field windings on said commutator machine connected in series with the commutated winding thereof and with the secondary windings of said induction motor, the windings of said commutator machine being arranged so as to substantially compensate each other such that in so far as the flow therein of the secondary current of the induction motor alone is concerned neither motor nor generator action would be produced in such commutated machine, and a series transformer in the primary circuit of said induction motor for supplying excitation to the commutated winding of said commutator machine to correct the power factor of said induction motor.

In witness whereof, I have hereunto set my hand this 27th day of October 1925.

WILHELM WEILER.